(12) United States Patent
Li et al.

(10) Patent No.: US 11,222,113 B1
(45) Date of Patent: Jan. 11, 2022

(54) AUTOMATICALLY GENERATING MALWARE DEFINITIONS USING WORD-LEVEL ANALYSIS

(71) Applicant: CA, INC., San Jose, CA (US)

(72) Inventors: Weiliang Li, Summerdale (SG); Zhicheng Zeng, Singapore (SG)

(73) Assignee: CA, INC., San Jose, CA (US)

(*) Notice: Subject to any disclaimer, the term of this patent is extended or adjusted under 35 U.S.C. 154(b) by 337 days.

(21) Appl. No.: 16/363,709

(22) Filed: Mar. 25, 2019

(51) Int. Cl.
    *G06F 21/56* (2013.01)

(52) U.S. Cl.
    CPC ......... *G06F 21/563* (2013.01); *G06F 21/567* (2013.01); *G06F 21/568* (2013.01); *G06F 2221/033* (2013.01)

(58) Field of Classification Search
    CPC ..... G06F 21/563; G06F 21/564; G06F 21/561
    See application file for complete search history.

(56) References Cited

U.S. PATENT DOCUMENTS

| 5,452,442 A * | 9/1995 | Kephart ............... G06F 21/564 713/188 |
| 8,239,948 B1 * | 8/2012 | Griffin ............... H04L 63/1433 726/24 |
| 2003/0046558 A1 * | 3/2003 | Teblyashkin .......... G06F 21/564 713/188 |
| 2018/0196944 A1 * | 7/2018 | Coroiu ................ G06F 16/152 |

* cited by examiner

*Primary Examiner* — Ellen Tran
(74) *Attorney, Agent, or Firm* — Foley & Lardner LLP

(57) ABSTRACT

Methods and systems are provided for automatically generating malware definitions and using generated malware definitions. One example method generally includes receiving information associated with a malicious application and extracting malware strings from the malicious application. The method further includes filtering the malware strings using a set of safe strings to produce filtered strings and scoring the filtered strings to produce string scores by evaluating words of the filtered strings based on word statistics of a set of known malicious words. The method further includes selecting a set of candidate strings from the filtered strings based on the string scores and generating a malware definition for the malicious application based on the set of candidate strings. The method also includes performing one or more security actions to protect against the malicious application, using the malware definition.

20 Claims, 5 Drawing Sheets

AUTOMATICALLY GENERATING MALWARE DEFINITIONS USING WORD-LEVEL ANALYSIS

BACKGROUND

Field

Embodiments of the present invention generally relate to detecting and analyzing malware.

Description of the Related Art

As computing devices continue to perform more functions, and with increased connectivity of computing devices, protecting computing devices from malware increases in importance. One typical method of malware protection involves the use of malware definitions to identify malware based on identifying strings of code (such as text or binary data). In order to use this method, the identifying strings of code must be identified and isolated to form part of a malware definition. However, the process of identifying and isolating the strings of code may be time consuming and prone to error when performed manually. Therefore, systems and methods are needed which can automatically generate reliable malware definitions.

SUMMARY

One embodiment of the present disclosure provides a method for automatically generating malware definitions. The method generally includes receiving information associated with a malicious application and extracting malware strings from the malicious application. The method further includes filtering the malware strings using a set of safe strings to produce filtered strings and scoring the filtered strings to produce string scores by evaluating words of the filtered strings based on word statistics of a set of known malicious words. The method further includes selecting a set of candidate strings from the filtered strings based on the string scores and generating a malware definition for the malicious application based on the set of candidate strings. The method also includes performing one or more security actions to protect against the malicious application, using the malware definition.

Another embodiment is a computing device for automatically generating and using malware definitions. The computing device includes at least one processor and a memory coupled to the processor. The processor is configured to receive information associated with a malicious application and extract malware strings from the malicious application. The processor is also configured to filter the malware strings using a set of safe strings to produce filtered strings and score the filtered strings to produce string scores by evaluating words of the filtered strings based on word statistics of a set of known malicious words. The processor is also configured to select a set of candidate strings from the filtered strings based on the string scores and generate a malware definition for the malicious application based on the set of candidate strings. The processor is further configured to perform one or more security actions to protect against the malicious application, using the malware definition.

Still another embodiment is a non-transitory computer-readable medium having instructions stored thereon which, when executed by at least one processor of a computing device, perform operations for automatically generating and using malware definitions. The operations generally involve receiving information associated with a malicious application and extracting malware strings from the malicious application. The operations further include filtering the malware strings using a set of safe strings to produce filtered strings and scoring the filtered strings to produce string scores by evaluating words of the filtered strings based on word statistics of a set of known malicious words. The operations further include selecting a set of candidate strings from the filtered strings based on the string scores and generating a malware definition for the malicious application based on the set of candidate strings. The operations further include performing one or more security actions to protect against the malicious application, using the malware definition.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
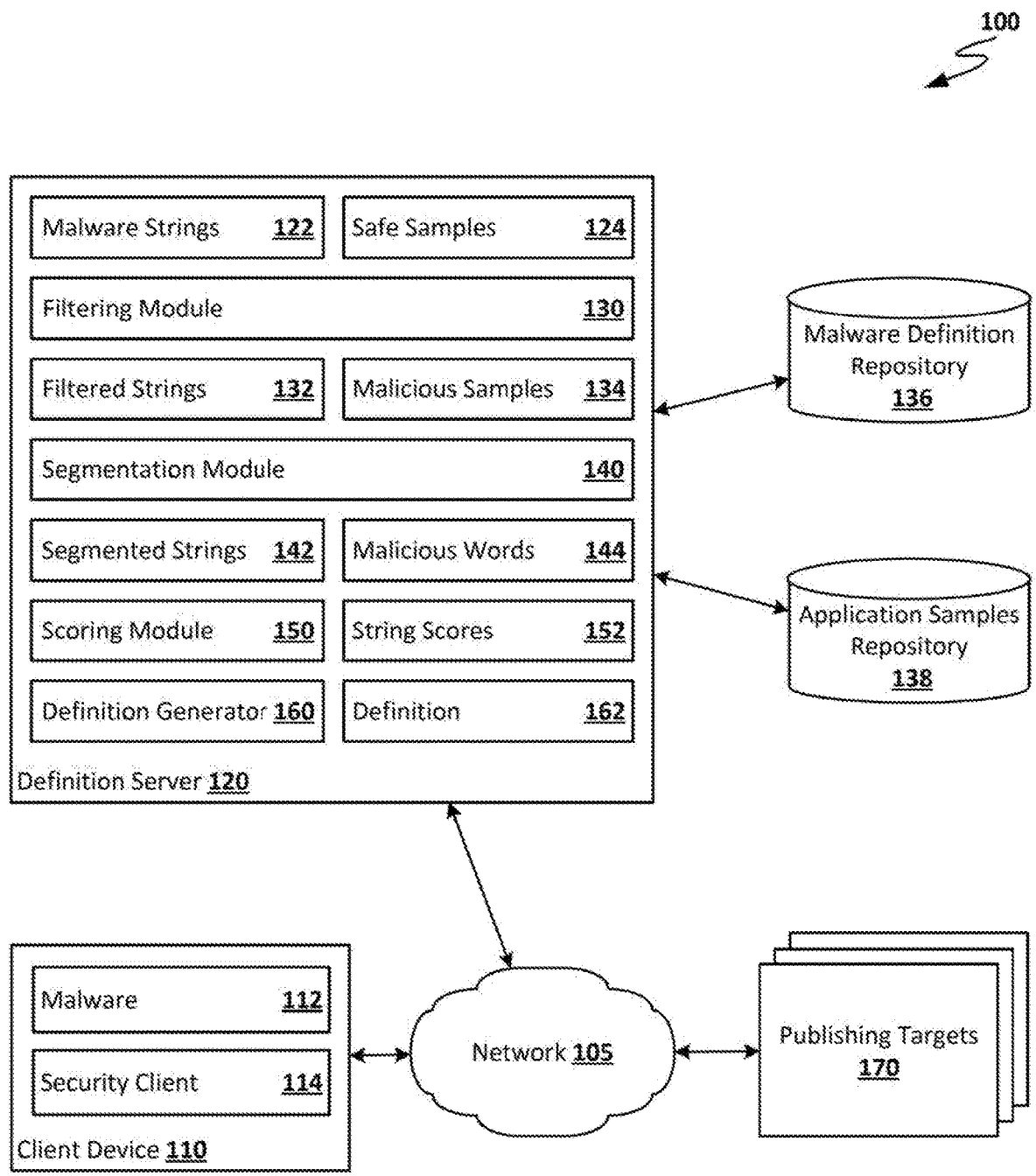
FIG. 1 is a block diagram of an example computing environment in which systems of the present disclosure may operate, according to an embodiment of the present disclosure.

Generally, malware definitions are produced manually by a malware expert, which is time-consuming and potentially expensive. Because of the time investment required, responding to a newly identified malware may be delayed until a useable malware definition is produced, thus lengthening the amount of time computing devices are vulnerable to the newly identified malware.

Previous attempts at automation of malware generation have encountered several problems. First, identification of malicious strings from malware is difficult if not impossible if exact copies of the malicious strings are not available from previously identified malicious samples. Second, even if a malicious string can be automatically identified, simple modifications or permutations of the malicious string may allow the malware to evade the definition. Further, because of the first and second problems, malware experts generally need to supervise automatic malware definition generation in order to prevent errors, thus eliminating most of the time-saving benefits of automation.

Disclosed herein are techniques to allow for the automatic generation of malware definitions that are usable and reliable. In general, by segmenting potentially malicious strings from a malware into component words, the suitability of the potentially malicious strings as malware definitions can be determined based on the component words rather than a string as a whole. By use of word-level rather than string-level analysis, new malicious strings (that is, malicious strings without an exact match in known malicious samples) can be identified by an automatic malware definition generator, which is not possible with existing automation systems. Further, the use of word-level analysis allows simple modifications of malicious strings to be identified by the automatic malware definition generator, which is also not possible with existing automation systems.

Consider the following illustrative example: An automatic definition generator receives a request to generate a definition for newly identified malware. The automatic definition generator first extracts all strings of the newly identified malware, and filters out harmless strings using a set of known safe strings. In this example, one of the remaining strings is "getphishingport( )." Then, the automatic definition generator segments the words of the remaining strings into the component words of the strings. In this example, the string "getphishingport( )" would be segmented into the words "get," "phish" and "port."

After segmentation, the strings can be scored based on the likelihood of being malicious using known information about the component words. In this example, although "get" and "port" are relatively harmless words, the word "phish" has a very high chance of being part of a malicious string, so "getphishingport( )" is identified as being likely malicious. This can be true even if the automatic definition generator has never encountered the exact string "getphishingport( )" previously, and only has information related to the word "phish" in general. For example, the automatic definition generator may have access to a malicious sample such as "phishinjectiontype," or other malicious samples including the word "phish." Thus, modifications to the string "getphishingport( )" (such as "getphishport( )" or "findphishport( )") can also be identified by the automatic definition generator, reducing the ability of malware authors to evade detection.

After "getphishingport( )" is identified by the automatic definition generator as having a high likelihood of being malicious, the automatic definition generator can use "getphishingport( )" to generate the definition for the newly identified malware. The definition can be provided to a security application so that the security application can detect the newly identified malware on a computing device executing the security application. Note that in this example, the text "getphishingport( )" is used only for ease of understanding and that in practice a malware definition may be based on binary code corresponding to text strings in addition to or instead of the text strings themselves.

FIG. 1 is a block diagram of an example computing environment 100 in which systems of the present disclosure may operate, according to an embodiment of the present disclosure. Computing environment 100 includes client device 110, definition server 120 and publishing targets 170, all connected via network 105. Computing environment 100 is used to illustrate one system structure for automatically generating a malware definition, although the methods described herein may be implemented in a variety of different system contexts.

Client device 110 is a computing device including at least a processor and memory (not shown). Client device 110 may be a variety of computing devices, such as a cellphone or other mobile device, a laptop computer, desktop computer or a server in a datacenter. Client device 110 also includes malware 112 and security client 114. Malware 112 is a software application written by a malicious entity to execute on client device 110. Malware 112 may be any of a variety of malicious software types, such as a worm, a virus, a Trojan horse, etc. Security client 114 is a software application executing on client device 110 that is used to identify and perform remediation actions on malware, such as malware 112.

In this example, security client 114, while performing monitoring, detects malware 112 on client device 110, such as by recognizing a malicious action (or attempted malicious action) of malware 112. Security client 114 can then neutralize malware 112, such as by quarantining malware 112 or removing malware 112 from client device 110. In order to prevent infections of malware 112 on other computing devices, security client 114 can then transmit malware 112 to definition server 120 to allow definition server 120 to generate a malware definition for malware 112.

Definition server 120 is a computing device including at least a processor and memory (not shown). Definition server 120 includes a variety of software modules and is used to store and manipulate various data elements in order to automatically generate malware definitions. In this example definition server 120 is shown as a single entity, however in other examples, the functions of definition server 120 may be performed by a cloud computing system or other distributed computing system. In still other examples, the functions of definition server 120 (including definition generation) and the functions of client device 110 (including detecting malware) may be performed by a single device. Further, in this example definition server 120 is connected to malware definition repository 136 and application samples repository 138. However, in other examples, malware definition repository 136 and application samples repository 138 may be available to definition server 120 over a network connection or may be storage devices included within definition server 120.

In this example, definition server 120 receives malware 112 from client device 110. After receipt of malware 112, definition server 120 initiates a process of automatically generating a malware definition for malware 112. To begin this process, definition server 120 extracts malware strings 122 from malware 112. Malware strings 122 are a collection of strings (such as text, binary or hexadecimal strings). Some, but likely not all, of malware strings 122 may be used to generate a definition for malware 112.

Next, definition server obtains safe samples 124 from application samples repository 138. Application samples repository 138 is a database of samples from previously analyzed applications. Application samples repository 138 may include samples from safe (non-malicious) applications as well as malware and may subdivide such samples from malware into safe samples and malicious samples. At this step, safe samples 124 are obtained from application samples repository 138 and may include safe samples from known malware as well as samples from safe applications.

Definition server 120 also includes filtering module 130. Filtering module 130 is a software routine executing on definition server 120. Filtering module 130 uses safe samples 124 to filter malware strings 122 into filtered strings 132. In general, any match between strings of malware strings 122 and safe samples 124 indicates that the matching string is not malicious. Thus, filtered strings 132 are the remaining strings from malware strings 122 after removing all strings that are known to be safe, leaving strings that are potentially malicious.

Next, definition server obtains malicious samples 134 from malware definition repository 136 and application samples repository 138. Malware definition repository 136 is a database of malware definitions used by security applications such as security client 114. In general, malware definitions include one or more identifying malicious strings that are matched with strings in malware. Malicious samples 134 includes malicious samples from known malware in application samples repository 138, as well as identifying malicious strings used in malware definitions stored in malware definition repository 136.

Definition server 120 also includes segmentation module 140. In general, segmentation module 140 is a software routine executing on definition server 120 that segments strings into component words. In this example, segmentation module 140 segments filtered strings 132 into segmented strings 142, and segments malicious samples 134 into malicious words 144. Generally, during segmentation, all non-alphanumeric characters of filtered strings 132 are removed.

Segmentation module 140 may perform various actions to segment strings. Segmentation module 140 may identify breaks between words based on the capitalization of words or based on separators (e.g., hyphens, underscores, etc.) between words. Segmentation module 140 may also make use of a dictionary of malware terms (not shown). The dictionary of malware terms may be prepared by a human malware expert in order to capture meaningful words in a string. For example, some words in code (e.g., "kill" or "upload") may be significant in a malware context. By use of the dictionary of malware terms, segmentation module 140 may be able to identify words in a string even when the string contains no capitalization, separators or other clear demarcations of word boundaries.

Segmentation module 140 may also perform various natural language processing (NLP) tasks to improve the quality of data stored as segmented strings 142 and malicious words 144. For example, NLP tasks may include tokenization and stemming, among other tasks. Stemming is the process of reducing inflected (or sometimes derived) words to their word stem, base, or root form. Stemming algorithms such as Porter's Algorithm and others may be applied during stemming. Lemmatization is a more complex approach to determining a stem of a word that involves first determining the part of speech of a word, and applying different normalization rules for each part of speech. In lemmatization, the part of speech is first detected prior to attempting to find the root since, for some languages, the stemming rules change depending on a word's part of speech. For example, if segmentation module 140 detects the word "phishing" as part of a string, it may instead store the word "phish."

Malicious words 144 are a collection of all words from malicious samples 134. By analyzing this collection of words, statistics relating to malicious words 144 may be obtained and stored within malicious words 144. For example, a frequency of appearance of a particular word in malicious samples 134 may be determined and stored alongside the particular word. In general, a word that more frequently appears in malicious samples 134 may be more likely to be a malicious word whose presence in a string indicates the string may be malicious.

Malicious words 144 may also include a score for each word. For example, scores for words may be scaled from 0 to 100, normalized such that 0 is given for the lowest frequency of appearance, while 100 is given for the highest frequency of appearance. For a word that does not appear in malicious samples 134, a score of 0 may be given, while a word of relatively frequent appearance in malicious samples 134 may be given a score closer to 100. In other examples, other scales for scores may be used, such as from 0 to 50, or scores may not be normalized such that the score directly corresponds to the number of appearances of a particular word in malicious samples 134.

Segmented strings 142 are filtered strings 132 after segmentation. In general, segmented strings 142 may be stored as a set of vectors of varying dimensions, with a first dimension of each vector including the entire string, and each subsequent dimension including a single component word of the string. In other examples, other data structures other than vectors may be used to store segmented strings 142, including matrices.

After segmentation is complete, definition server 120 can then score segmented strings 142. In particular, definition server 120 also includes scoring module 150, a software routine executing on definition server 120 that scores segmented strings 142 based on the scores of malicious words 144. For a particular string of segmented strings 142, scoring module 150 determines a numeric score for each word of the particular string and then combines the scores for each word to obtain a total score for the particular string.

Scoring module 150 produces string scores 152, with each score of string scores 152 corresponding to a particular string of segmented strings 142. Definition server 120 may thereafter select a set of candidate strings for use in generating a definition, based on string scores 152. For example, definition server 120 may select three candidate strings corresponding to the three highest string scores 152, although the number of candidate strings selected may vary depending on the configuration of definition server 120, or definition server 120 may instead take all candidate strings corresponding to strings scores 152 that exceed a particular threshold score. Because the candidate strings are associated with the highest string scores 152, the candidate strings are the most likely strings of malware 112 to be malicious strings, and thus the most suitable for inclusion in a malware definition for malware 112.

Definition server 120 also includes definition generator 160, a software routine executing on definition server 120 to automatically generate malware definitions based on malicious strings. In this example, based on the highest-scoring candidate strings selected by definition server 120, definition generator 160 generates definition 162. In general, the generation of a malware definition may include formatting the candidate strings to be compatible with a particular security application, such as security client 114. Definition 162 is a malware definition for malware 112, which can be used to detect malware 112 on computing devices.

After generation of definition 162, definition server 120 may publish definition 162 to publishing targets 170 via network 105. Publishing targets 170 may be a variety of networked entities, such as other computing devices similar to client device 110. Publishing targets execute security applications, such as other instances of security client 114, which can use definition 162 to detect infections of malware 112 on publishing targets 170.

Consider the following illustrative example of the operation of computing environment 100. In this example, malware definition repository 136 includes a malware definition that identifies the strings "phishinjectiontype" and "mobi&androidsdkhook" as malicious strings for a particular type of malware. The malware definition may be segmented by segmentation module 140 into the words "phish" and "injection" for "phishinjectiontype" and the words "mobi," "android," "sdk" and "hook" for "mobi&androidsdkhook." Based on analysis of malicious words 144, definition server 120 may establish the following scores for the above words based on the frequency of appearance for each word in malicious samples 134: "phish" is scored 15, "injection" is scored 6, "mobi" is scored 20, "android" is scored 8, "sdk" is scored 5 and "hook" is scored 20.

After establishing the above scores, definition server 120 receives malware 112 from client device 110. After filtering, the strings of malware 112 includes only the strings "getphishingport( )" and "androidOSinjection." These strings, when segmented, include the words "get," "phish" and "port" for "getphishingport( )" and "android," "OS" and "injection" for "androidOSinjection." In this example, "getphishingport( )" includes a single potentially malicious word, "phish," which is scored at 15, while "androidOSinjection" includes two potentially malicious words, "android" scored at 8 and "injection" scored at 6. Thus, although "androidOSinjection" includes two potentially malicious words, the combined score for "androidOSinjection" is 14, while the single potentially malicious word of "getphishingport( )" results in a higher overall score of 15. Thus, "getphishingport( )" would be deemed a more suitable candidate string for the generation of a malware definition for malware 112. However, in practice, both strings may be used for the generation of the malware definition.

Definition server 120 can then generate a malware definition for malware 112 using the string "getphishingport( )." Generating a malware definition automatically may include generating and combining logical rules for enforcement by a security application. In this example, one such logical rule may be MalwareType_A=String('getphishingport')

In this example, "MalwareType_A" refers to malware 112 or modifications of malware 112.

In order to improve detection of similar types of malware, more complicated logical rules may be generated by definition server 120. For example, by noting the relationship between the earlier malware definition (including the strings "phishinjectiontype" and "mobi&androidsdkhook") and malware 112, definition server 120 is able to generate a logical rule such as MalwareType_B:=(String('getphishingport(') OR String('phishinjectiontype')) AND String('mobi&androidsdkhook')

The logical rules for "MalwareType_A" and "MalwareType_B" may be used in conjunction by a security application to detect more variations of malware 112 than either alone.

Figure 2:
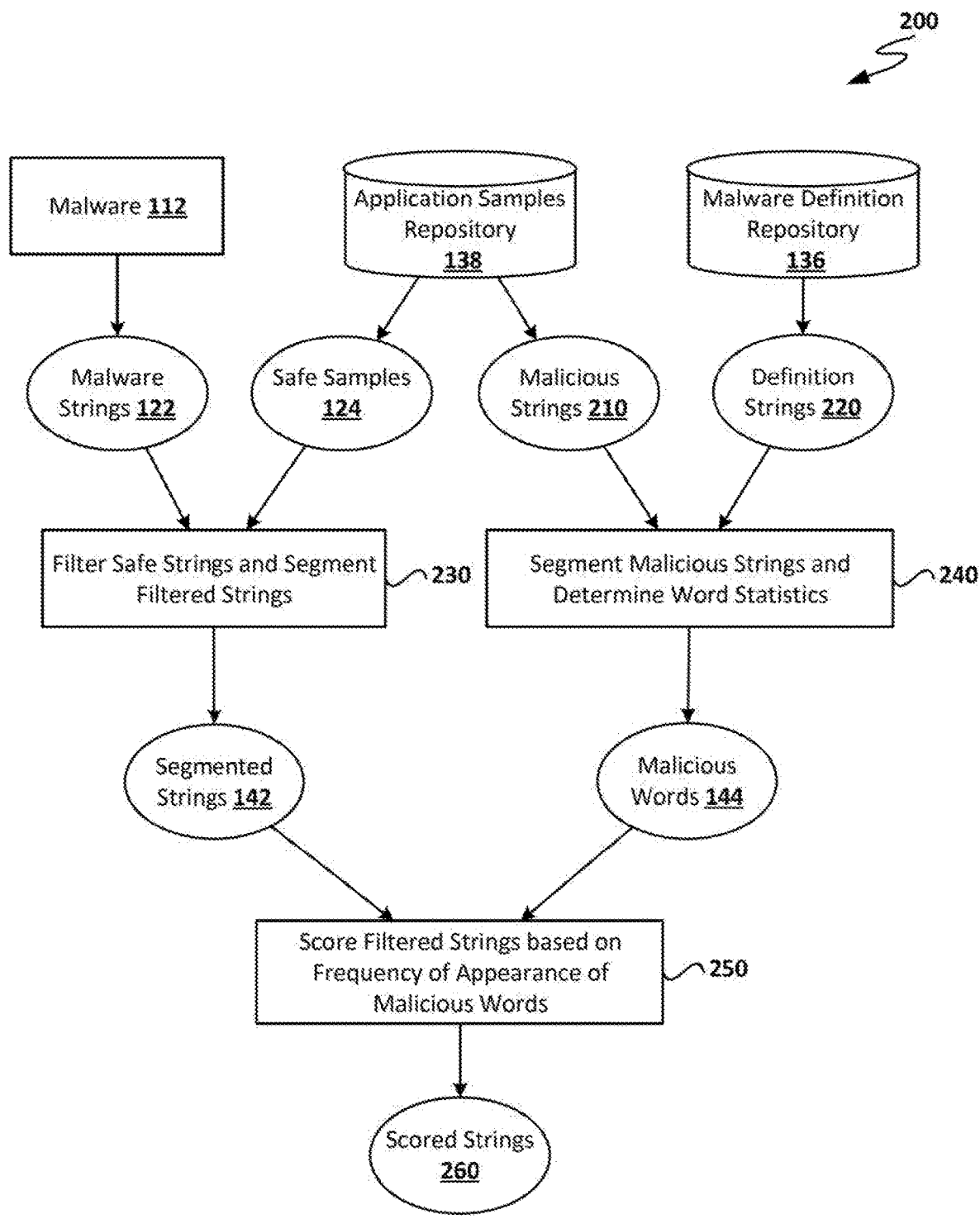
FIG. 2 is a conceptual diagram of analyzing strings from a malicious application, according to an embodiment of the present disclosure.

FIG. 2 is a conceptual diagram of a process 200 for analyzing strings from a malicious application, according to an embodiment of the present disclosure. Process 200 can be performed by a definition server, such as definition server 120 of FIG. 1. At the top level, process 200 includes malware 112, application samples repository 138 and malware definition repository 136.

As discussed above, the definition server extracts malware strings 122 from malware 112 and safe samples 124 from application samples repository 138. Definition server also individually extracts malicious strings 210 from application samples repository 138 and definition strings 220 from malware definition repository 136. Malicious strings 210 are known malicious strings from application samples repository 138, while definition strings 220 are strings used in definitions of malware, stored in malware definition repository 136. Malicious strings 210 and definitions strings 220 may together correspond to malicious samples 134 of FIG. 1.

At 230, the definition server filters malware strings 122 using safe samples 124 to eliminate known safe strings from malware strings 122. The resulting potentially malicious strings are filtered strings. The filtered strings may still include safe strings, so long as such safe strings do not exactly match strings in safe samples 124. After filtering, the definition server segments the resulting filtered strings to produce segmented strings 142. The process of segmentation may be aided by a dictionary of malware terms as discussed above.

At 240, the definition server segments malicious strings 210 and definition strings 220 into a set of malicious words. Using the dictionary of malware terms discussed above, irrelevant words may be omitted from the set of malicious words. For example, in the string "mobi&androidsdkhook," although the symbol "&" may represent a distinct word within the string, it has no value for malware analysis purposes, and thus may be omitted. The dictionary of malware terms may be used such that, a failure to find a word (such as "&") within the dictionary indicates it should not be stored in malicious words 144. After segmentation, the definition server calculates statistics for the set of malicious words. In some cases, the statistics for the set of malicious words include a frequency of appearance of each word within malicious strings 210 and definition strings 220. The set of malicious words and the corresponding statistics are stored by the definition server as malicious words 144.

For example, definition strings 220 may include the following strings: "usercalllog," "*killWeChat," "recordedCalls," "getCameraPhoto," "fetchContacts," "spamlistw," "FakeInboxSMS," "needUpload," "sendSmsTask," "hidelcon," "Monitor.TelephoneRecord," and "GETCMD." Note that this list is non-exhaustive and many other possible strings may be used in malware definitions. These strings include many potentially malicious words, including: "user," "call," "log," "kill," "upload," "fetch," "contact," "get," "send," "sms," "task," "hide," "icon," "monitor," "spam," "list," "fake," "record," and "cmd." By assessing the frequency of appearance of each of these words within definition strings 220 and malicious strings 210, the definition server can establish scores for each of these words.

At 250 the definition server scores segmented strings 142 based on the determined statistics of each component word of segmented strings 142 within malicious words 144. The definition server can then combine the scores for each component word, to produces scored strings 260, which are segmented strings 142 stored alongside their respective string scores. For example, if segmented strings 142 are stored as vectors, one dimension of the vectors may be used to the store string score. In other cases, rather than scoring each word and combining the word scores, the definition server may calculate scores for the strings as a whole, such as by counting the number of malicious words in the string, scoring only strings with a minimum or maximum number of malicious words, summing pre-defined weighted values for the malicious words or other string-level scoring procedures. In general, the score for a string is based on the combined input of the component words of the string.

Following from the example above, if malware 112 includes the string "CMD_UPLOAD_FILE," a score for the string may be based on a combination of the scores for "cmd," "upload," and "file." If "cmd," "upload," and "file" are scored at 50, 60, and 25, respectively, the score for "CMD_UPLOAD_FILE" may be 135 (the sum of 50, 60, and 25) or may be an average value, such as 45 (mean value of 50, 60, and 25).

Although process 200 is shown as a parallel process, in practice the steps at 230 and at 240 may be performed at different times. For example, step 240 may be performed as part of an initial setup, to prepare malicious words 144 for use in analyzing a plurality of different malwares. Thereafter, malicious strings 210 or definition strings 220 may be updated, such as by an addition of string from malware 112 to the set of known malicious samples. Afterwards, step 240 may be repeated to in-turn update malicious words 144.

Figure 3:
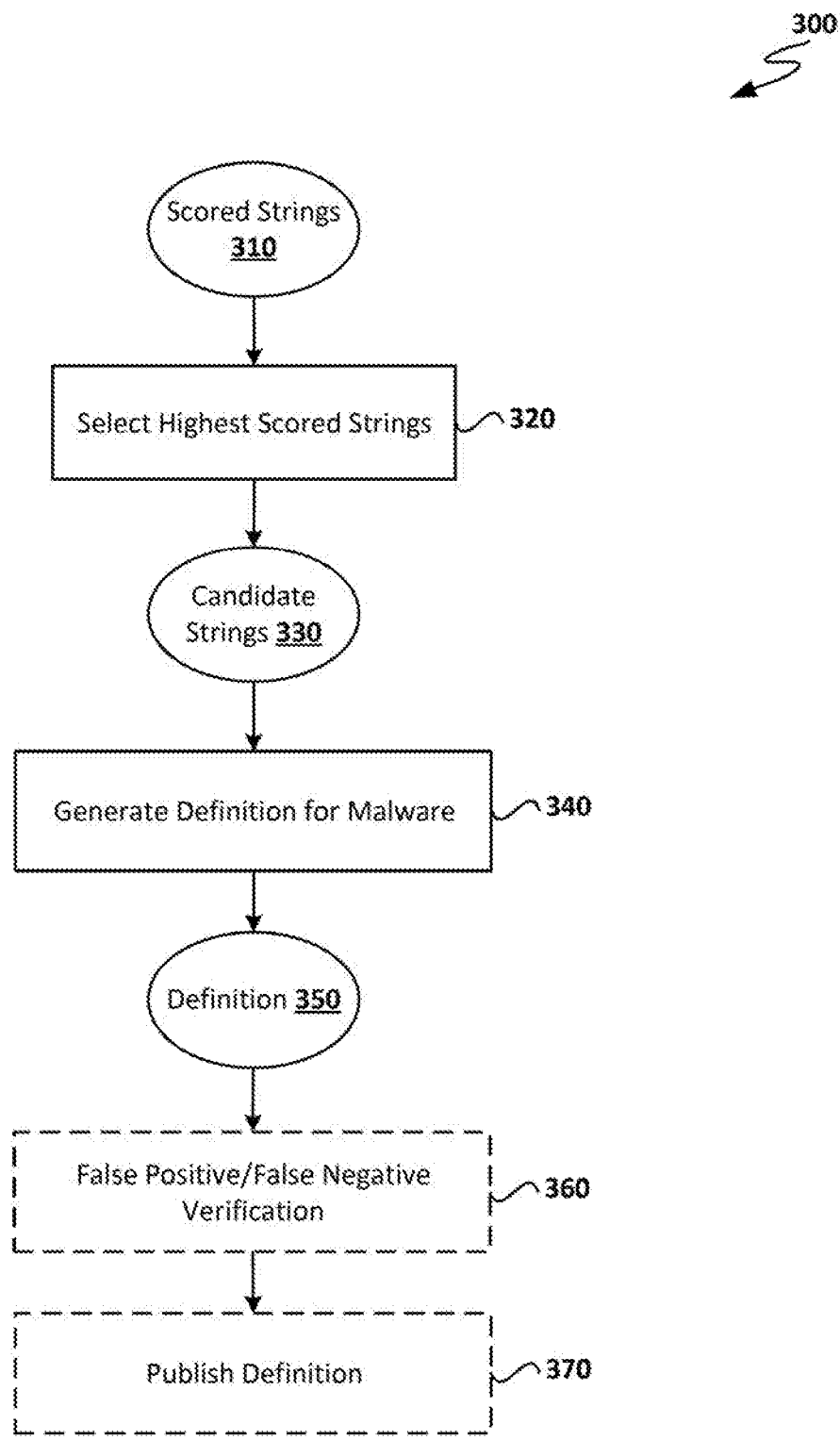
FIG. 3 is a conceptual diagram of generating a malware definition, according to an embodiment of the present disclosure.

FIG. 3 is a conceptual diagram of a process 300 for generating a malware definition, according to an embodiment of the present disclosure. Process 300 may be a continuation of process 200 of FIG. 2. Like process 200, process 300 may be performed by a definition server, such as definition server 120 of FIG. 1.

Process 300 begins with scored strings 310, which include potentially malicious strings from malware which have been scored according to the frequency of appearance of each component word of the potentially malicious strings in samples of known malware. At 320 the definition server selects the highest scoring strings of scored strings 310 as candidate strings 330. The highest scoring strings may be a set number of strings (e.g., the 3 highest scoring strings) or may be all strings over a certain threshold score (e.g., all strings scoring at least 50 on a 100 point scale, though other thresholds are possible). In general, candidate strings 330 represent the most likely malicious strings of the malware being analyzed, and thus represent the strings that can best be used to define the malware.

At 340, the definition server generates definition 350, which can be used to define the malware under analysis. As discussed above, the generation of malware definitions includes creating an identifier for the malware (which may be a generic identifier such as "MalwareType_1") and a one or more logical rules for identifying the malware based on candidate strings 330. Malware definitions may involve the logical operators "AND," "OR," "XOR," and "NOT" in addition to candidate strings 330.

In some examples of process 300, the definition server, at 360, performs a false positive and false negative verification on definition 350. In general, the false positive and false negative verification may be used to prevent the publication of a faulty or otherwise deficient malware definition.

A false positive verification may involve using definition 350 to check for malware within a sample of known safe software, such as safe samples 124 of FIG. 1. A security application replicating the action of performing malware monitoring on a user device may be provided with both safe samples and definition 350. If the check using definition 350 indicates malware within the safe samples, definition 350 leads to false positives, that is, safe software erroneously indicated as malicious. If the check does not indicate malware within the safe samples, the risk of definition 350 producing false positives is reduced.

A false negative verification may involve using definition 350 to check the malware under analysis itself for malware. In this case, the security application may be provided with definition 350 and the actual malware, and attempts to detect malware using the definition 350. If the security application does not flag the actual malware as malicious, then definition 350 leads to false negatives, that is, malicious software evades definition 350. False negative verification quality may be improved by increasing the pool of known malware matching definition 350. For example, if multiple reports are received from user devices relating to the same malicious activity, all malware associated with that malicious activity can be used to perform false negative verification.

If definition 350 fails either the false positive or false negative verification, the definition server may alert an operator or administrator of the definition server of the failure. Afterwards, a malware expert may be able to manually alter definition 350 to correct errors leading to the false positive or false negative errors, or the operator of the definition server may modify software components of the definition server to prevent future false positive or false negative failures.

If definition 350 passes the false positive and false negative verifications, the definition server, at 370, publishes definition 350. As discussed above with respect to FIG. 1, publication of a malware definition may involve transmitting the malware definition to a plurality of security clients operating on user devices. For example, publication of a malware definition may take place as part of updating a security client, or updating a general definition file for the security client.

Figure 4:
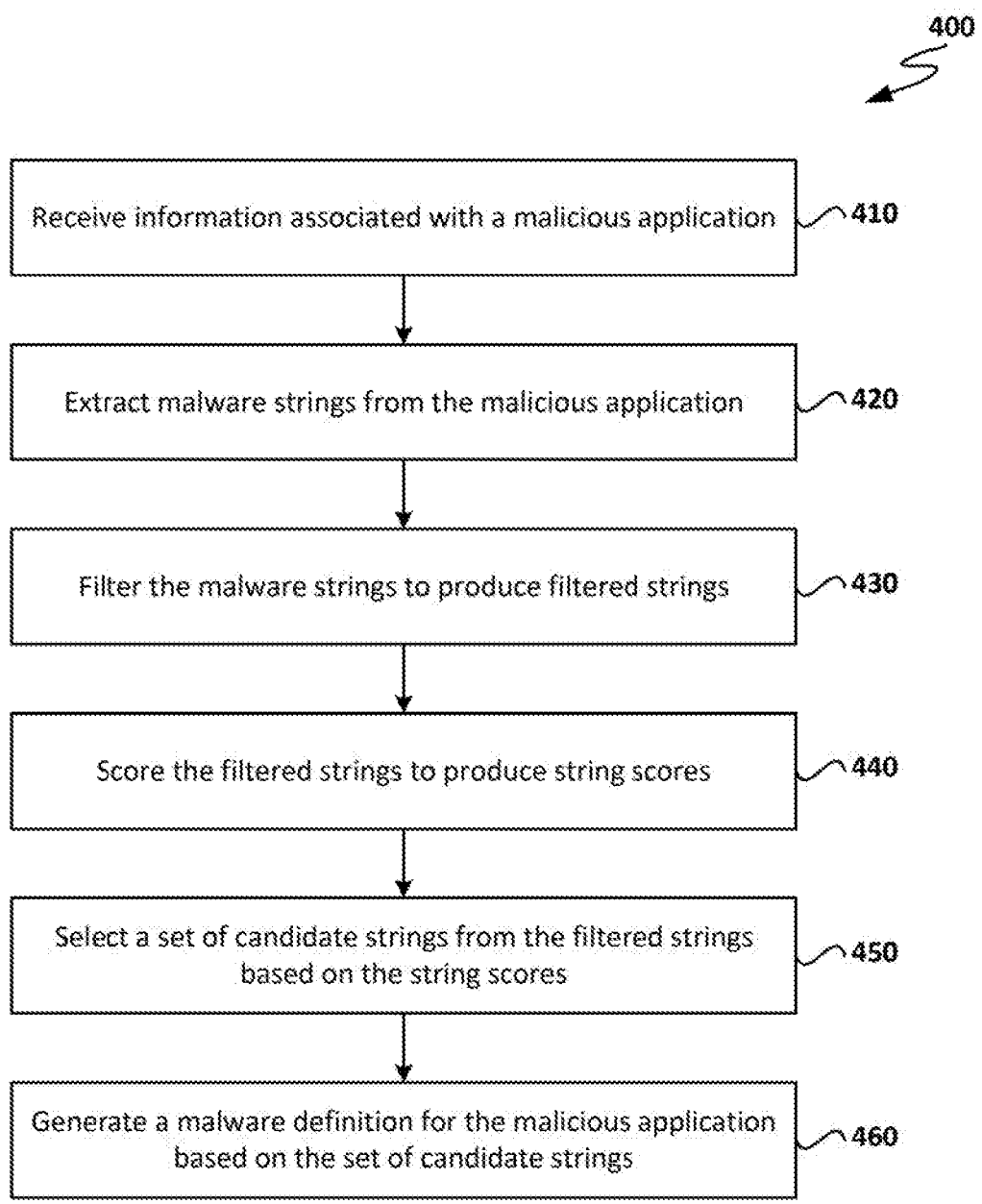
FIG. 4 is a flow diagram of an example method for automatically generating a malware definition, according to an embodiment of the present disclosure.

FIG. 4 is a flow diagram of an example method 400 for automatically generating a malware definition, according to an embodiment of the present disclosure. Method 400 is performed by a computing device, such as definition server 120 or client device 110 of FIG. 1.

At 410, the computing device receives information associated with a malicious application. As discussed above, if performed by a definition server, this information may be received from a security client executing on a client device. In other cases, the information may be received by the definition server from other computing devices, such as other nodes in a security system. If performed by the client device, the information may be generated by software executing on the client device, such as a security application monitoring for malware and malicious activity.

At 420, the computing device extracts malware strings from the malicious application. While the malware strings are derived from a malicious application, the malware strings are not necessarily malicious. In general, software is composed of strings of code, which may be computer-readable rather than legible text if source code of the software is not available. As a result, extracting strings from a malicious application may involve decomposing computer-readable text into strings.

At 430, the computing device filters the malware strings using a set of safe strings to produce filtered strings. The safe strings may be obtained from a repository for storing samples of known safe applications. In general, this filtering reduces the number of the malware strings under analysis, so that analysis can be focused on strings with a higher probability of being malicious.

At 440, the computing device scores the filtered strings to produce string scores by evaluating words of the filtered strings based on word statistics of a set of known malicious words. As discussed above, the word statistics may include a frequency of appearance of each word of the filtered strings within a set of known malicious samples. In general, each word is assigned a score based on the word statistics, and then each string's score is calculated by combining the scores assigned to the individual words. The scores may be combined by finding an average (e.g., mean, median or mode) of the component word scores, by summing the component word scores, or otherwise determining a combined value for the component word scores.

At 450, the computing device selects a set of candidate strings from the filtered strings based on the string scores. As discussed above, this may involve selecting a set number of highest scoring strings, or all candidate strings above a score threshold. In general, strings with higher scores are more likely to be malicious and thus a more suitable part of a definition for the malicious application.

At 460, the computing device generates a malware definition for the malicious application based on the set of candidate strings. Malware definition generation may include the use of logical rules and logical operators, as discussed above. In general, the quality of a malware definition depends on the suitable of identifying strings used in the malware definition, which in this case are the candidate strings selected at 450. The use of method 400 allows for the automatic generation of malware definitions of high quality, by identifying candidate strings which are most likely to be suitable identifying strings for the malicious application.

Some examples of method 400 further include performing one or more security actions on the computing device using the malware definition. For example, performing malware monitoring on the computing device using the malware definition is one possible security action. Security actions may also include blocking a download of a computer file on the computing device, warning a user of the computing device about the computer file, preventing the computer file from performing any actions on the computing device, alerting an administrator to the potential maliciousness of the computer file, quarantining the computer file, deleting the computer file, and, in some circumstances, performing a lockdown of the computing device. Note that this list is non-exhaustive and other possible security actions may be taken.

In some examples of method 400 generating the malware definition for the malicious application comprises formatting the set of candidate strings to be compatible with a security client. The security client may execute on a client device or user device to monitor for and perform remedial actions on malware.

Some examples of method 400 further include performing a false positive and false negative verification on the malware definition. In such examples, method 400 may also include publishing the malware definition to a plurality of publication targets.

Still other examples of method 400 include, prior to scoring the filtered strings, segmenting the filtered strings using a dictionary of malware terms.

In some examples of method 400, the set of known malicious words comprise words derived from a set of known malicious strings and words derived from at least one existing malware definition. In such examples, the word statistics of the set of known malicious words includes frequency of appearance of a word of the set of known malicious words in existing malware definitions.

Figure 5:
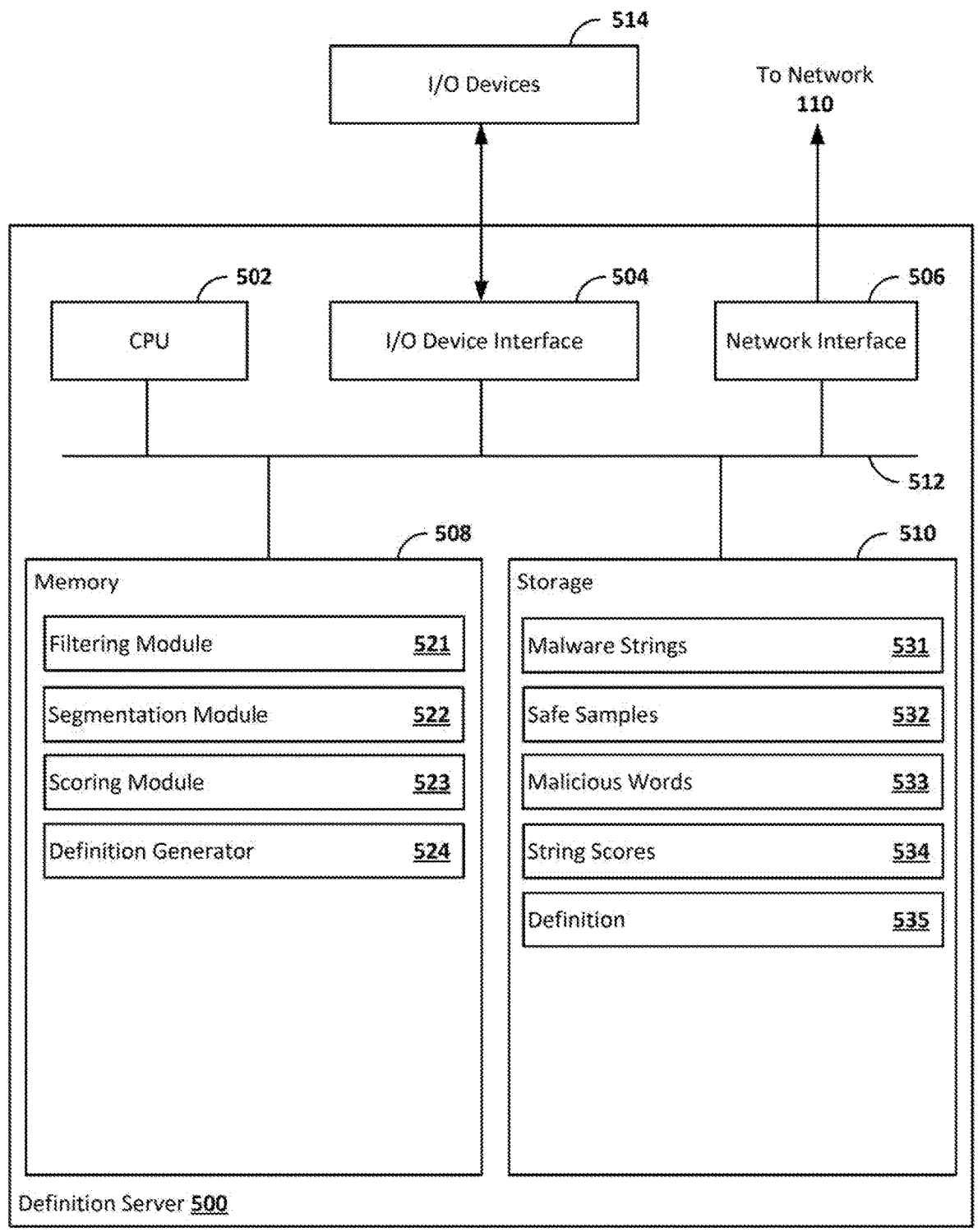
FIG. 5 is a block diagram of an example definition server, according to an embodiment of the present disclosure.

FIG. 5 is a block diagram of an example definition server 500, according to an embodiment of the present disclosure. As shown, definition server 500 includes, without limitation, a central processing unit (CPU) 502, one or more input/output (I/O) device interfaces 504, which may allow for the connection of various I/O devices 514 (e.g., keyboards, displays, mouse devices, pen input, etc.) to the definition server 500, network interface 506, memory 508, storage 510, and an interconnect 512.

The CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. The CPU 502 is included to be representative of a single CPU, multiple CPUs, a single CPU having multiple processing cores, and the like. The I/O device interface 504 may provide an interface for capturing data from one or more input devices integrated into or connected to the definition server 500, such as keyboards, mice, touchscreens, and so on. The memory 508 may represent a random access memory (RAM), while the storage 510 may be a solid state drive, for example. Although shown as a single unit, the storage 510 may be a combination of fixed and/or removable storage devices, such as fixed drives, removable memory cards, network attached storage (NAS), or cloud-based storage.

As shown, the memory 508 includes filtering module 521, segmentation module 522, scoring module 523 and definition generation 524. Filtering module 521, segmentation module 522, scoring module 523 and definition generation 524 are software routines executed based on instructions stored in the storage 510.

Such instructions may be executed by the CPU 502.

As shown, the storage 510 includes malware strings 531, safe samples 532, malicious words 533, strings scores 534 and definition 535. In general, definition server 500 extracts malware strings 531 from a particular malware. Filtering module 521 then uses safe samples 532 to filter malware strings 531 into filtered strings. Segmentation module 522 then segments the filtered strings into segmented strings. Then, scoring module 523 scores the segmented strings using malicious words 533 to produce string scores 534. Then, definition generator 524 generates definition 535 based on strings associated with the highest scoring string scores 534. Thereafter, definition server 500 may transmit definition 535 to other computing devices, such as via network interface 506.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer-readable media having computer-readable program code embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for automatically generating and using malware definitions, at least a portion of the method being performed by a computing device comprising one or more processors, the method comprising:
   receiving information associated with a malicious application;
   extracting malware strings from the malicious application;
   filtering the malware strings using a set of safe strings to produce filtered strings;
   scoring the filtered strings to produce string scores by evaluating words of the filtered strings based on a frequency of appearance of a set of known malicious words;
   selecting a set of candidate strings from the filtered strings based on the string scores;
   generating a malware definition for the malicious application based on the set of candidate strings; and
   performing one or more security actions to protect against the malicious application, using the malware definition.

2. The method of claim 1, wherein generating the malware definition for the malicious application comprises generating and combining logical rules for enforcement by a security application.

3. The method of claim 1, further comprising performing a false positive and false negative verification on the malware definition.

4. The method of claim 3, further comprising publishing the malware definition to a plurality of publication targets.

5. The method of claim 1, further comprising, prior to scoring the filtered strings, segmenting the filtered strings using a dictionary of malware terms.

6. The method of claim 1, wherein the set of known malicious words comprises:
   words derived from a set of known malicious strings; and
   words derived from at least one existing malware definition.

7. The method of claim 1, wherein performing the one or more security actions comprises performing malware monitoring on the computing device.

8. The method of claim 1, wherein segmenting the filtered strings using a dictionary of malware terms comprises:
   reducing inflected words to their root form.

9. A computing device for automatically generating and using malware definitions, comprising:
   at least one processor; and
   a memory coupled to the processor, wherein the processor is configured to:
      receive information associated with a malicious application;
      extract malware strings from the malicious application;
      filter the malware strings using a set of safe strings to produce filtered strings;
      score the filtered strings to produce string scores by evaluating words of the filtered strings based on a frequency of appearance of a set of known malicious words;
      select a set of candidate strings from the filtered strings based on the string scores;
      generate a malware definition for the malicious application based on the set of candidate strings; and
      perform one or more security actions to protect against the malicious application, using the malware definition.

10. The computing device of claim 9, wherein the processor is configured to generate the malware definition for the malicious application by generating and combining logical rules for enforcement by a security application.

11. The computing device of claim 9, wherein the processor is further configured to perform a false positive and false negative verification on the malware definition.

12. The computing device of claim 11 wherein the processor is further configured to publish the malware definition to a plurality of publication targets.

13. The computing device of claim 9, wherein the processor is further configured to, prior to scoring the filtered strings, segment the filtered strings using a dictionary of malware terms.

14. The computing device of claim 9, wherein the set of known malicious words comprises:
   words derived from a set of known malicious strings; and
   words derived from at least one existing malware definition.

15. The computing device of claim 9, wherein the processor is configured to perform the one or more security actions by performing malware monitoring.

16. The computing device of claim 9, wherein the processor is further configured to:
   reduce inflected words to their root form.

17. A non-transitory computer-readable medium having instructions stored thereon which, when executed by at least one processor of a computing device, perform operations for automatically generating and using malware definitions, the operations comprising:

receiving information associated with a malicious application;

extracting malware strings from the malicious application;

filtering the malware strings using a set of safe strings to produce filtered strings;

scoring the filtered strings to produce string scores by evaluating words of the filtered strings based on a frequency of appearance of a set of known malicious words;

selecting a set of candidate strings from the filtered strings based on the string scores;

generating a malware definition for the malicious application based on the set of candidate strings; and performing one or more security actions to protect against the malicious application, using the malware definition.

18. The computer-readable medium of claim 17, wherein generating the malware definition for the malicious application comprises generating and combining logical rules for enforcement by a security application.

19. The computer-readable medium of claim 17, wherein the operations further comprise:

prior to scoring the filtered strings, segmenting the filtered strings using a dictionary of malware terms;

performing a false positive and false negative verification on the malware definition; and publishing the malware definition to a plurality of publication targets.

20. The computer-readable medium of claim 17, wherein the set of known malicious words comprises:

words derived from a set of known malicious strings; and words derived from at least one existing malware definition.

* * * * *